(12) United States Patent
Huang et al.

(10) Patent No.: US 8,397,812 B2
(45) Date of Patent: *Mar. 19, 2013

(54) NANO-SIZED PARTICLE-COATED PROPPANTS FOR FORMATION FINES FIXATION IN PROPPANT PACKS

(75) Inventors: Tianping Huang, Spring, TX (US); James B. Crews, Willis, TX (US); John R. Willingham, Cypress, TX (US); James R. Pace, Spring, TX (US); Christopher K. Belcher, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/776,990

(22) Filed: May 10, 2010

(65) Prior Publication Data
US 2010/0286000 A1    Nov. 11, 2010

Related U.S. Application Data

(63) Continuation-in-part of application No. 11/931,501, filed on Oct. 31, 2007, now Pat. No. 7,721,803.

(51) Int. Cl.
*E21B 43/04* (2006.01)
*E21B 43/267* (2006.01)

(52) U.S. Cl. ..... 166/278; 166/276; 166/279; 166/280.2; 166/308.3

(58) Field of Classification Search .......... None
See application file for complete search history.

(56) References Cited

U.S. PATENT DOCUMENTS

| | | | |
|---|---|---|---|
| 5,518,996 | A | 5/1996 | Maroy et al. |
| 7,131,491 | B2 | 11/2006 | Blauch et al. |
| 7,204,311 | B2 | 4/2007 | Welton et al. |
| 7,258,170 | B2 | 8/2007 | Nguyen et al. |
| 2004/0137209 | A1 | 7/2004 | Zeller et al. |
| 2005/0107265 | A1 | 5/2005 | Sullivan et al. |
| 2005/0252658 | A1 | 11/2005 | Willingham et al. |
| 2007/0036977 | A1 | 2/2007 | Sinclair et al. |
| 2007/0066491 | A1 | 3/2007 | Bicerano et al. |
| 2007/0104923 | A1 | 5/2007 | Whitaker et al. |
| 2008/0087429 | A1 | 4/2008 | Brannon et al. |
| 2008/0099207 | A1 | 5/2008 | Venditto et al. |
| 2009/0065209 | A1 | 3/2009 | Huang et al. |
| 2009/0107673 | A1 | 4/2009 | Huang et al. |
| 2009/0111718 | A1 | 4/2009 | Gadiyar et al. |
| 2009/0312201 | A1 | 12/2009 | Huang et al. |

FOREIGN PATENT DOCUMENTS

WO   2008036812 A2   3/2008

OTHER PUBLICATIONS

Taguchi, Y et al., Preparation of fine composite particles composed of inorganic solid powders and organic polymers by utilizing liquid-liquid dispersion, Colloids and Surfaces A: Physicochemical and Engineering Aspects, vol. 153, 1999, pp. 401-404 (XP002530896).
Hibbeler, J. et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.
Nguyen, P.D. et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

*Primary Examiner* — Zakiya W Bates
(74) *Attorney, Agent, or Firm* — Mossman Kumar & Tyler PC

(57) ABSTRACT

A fracturing fluid, gravel pack fluid and/or frac pack fluid containing particles such as proppants, gravel and/.or sand, may contain an effective amount of a nano-sized particulate additive to fixate or reduce fines migration, where the particulate additive is an alkaline earth metal oxide, alkaline earth metal hydroxide, alkali metal oxides, alkali metal hydroxides transition metal oxides, transition metal hydroxides, post-transition metal oxides, post-transition metal hydroxides piezoelectric crystals and pyroelectric crystals. The nano-sized particulate additive is optionally bound to the particles with a coating agent such as an oil, alcohol, glycol, glycol ethers, ketones, terpenes, etc. The particle size of the magnesium oxide or other agent may be nanometer scale but may be a larger scale than nanometer but still relatively small, which scale may provide unique particle charges that help fixate the formation fines. The carrier fluid used in the treating fluid may be aqueous, brine, alcoholic or hydrocarbon-based.

9 Claims, 3 Drawing Sheets

NANO-SIZED PARTICLE-COATED PROPPANTS FOR FORMATION FINES FIXATION IN PROPPANT PACKS

CROSS-REFERENCE TO RELATED APPLICATION

This application is a continuation-in-part application of U.S. patent application Ser. No. 11/931,501 filed Oct. 31, 2007, issued May 25, 2010 as U.S. Pat. No. 7,721,803.

TECHNICAL FIELD

The present invention relates to methods and compositions for fixating formation fines from migrating during hydrocarbon recovery operations, and more particularly relates, in one non-limiting embodiment, to methods and compositions for fixating formation fines from migrating in proppant packs within subterranean formations during hydrocarbon recovery operations using small particles.

BACKGROUND

The migration of fines involves the movement of fine clay and/or non-clay particles (e.g. quartz, amorphous silica, feldspars, zeolites, carbonates, salts and micas) or similar materials within a subterranean reservoir formation due to drag and other forces during production of hydrocarbons or water. Fines migration may result from an unconsolidated or inherently unstable formation, or from the use of an incompatible treatment fluid that liberates fine particles. Fines migration may cause the very small particles suspended in the produced fluid to bridge the pore throats near the wellbore, thereby reducing well productivity. Damage created by fines is typically located within a radius of about 3 to 5 feet (about 1 to 2 meters) of the wellbore, and may occur in gravel-pack completions and other operations.

Fines migration is a complex phenomenon governed largely by mineralogy, permeability, salinity and pH changes, as well as drag forces created by flow velocity, turbulence and fluid viscosity, as described in detail in J. Hibbeler, et al., "An Integrated Long-Term Solution for Migratory Fines Damage," SPE 81017, SPE Latin American and Caribbean Petroleum Engineering Conference, Port-of-Spain, Trinidad, West Indies, 27-30 Apr. 2003, incorporated herein by reference in its entirety. The authors note that mobilization of fines can severely damage a well's productivity, and that fines damage is a multi-parameter, complex issue that may be due to one or more of the following downhole phenomena: (1) high flow rates, particularly abrupt changes to flow rates; (2) wettability effects, (3) ion exchange; (4) two-phase flow, particularly due to turbulence that destabilizes fines in the near-wellbore region; and (5) acidizing treatments of the wrong type or volume which can cause fines.

J. Hibbeler, et al. note that fines, especially clays, tend to flow depending on their wettability, and since fines are typically water-wet, the introduction of water may trigger fines migration. However, they note that clay particles may become oil-wet or partially oil-wet, due to an outside influence, and thus the fines and clay particles may become attracted to and immersed in the oil phase. The authors also note that all clays have an overall negative charge and that during salinity decrease, pH increases in-situ due to ion exchange. A pH increase may also be induced via an injected fluid. As pH increases, surface potential of fines increases until de-flocculation and detachment occurs, aggravating fines migration.

Fines fixation has become troublesome during oil and gas production and during many oil and gas recovery operations, such as acidizing, fracturing, gravel packing, and secondary and tertiary recovery procedures. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

Gravel packing is a sand-control method employed to prevent the production of formation sand. In gravel pack operations, a steel screen is placed in the wellbore and the surrounding annulus packed with a gravel of a specific size designed to prevent the passage of formation sand. The goal is to stabilize the formation while causing minimal impairment to well productivity. Operations combining fracturing and gravel packing are termed "frac packs".

It would be desirable if methods and/or compositions would be devised to help fix or stabilize fines within a subterranean formation so that their migration is reduced, inhibited or eliminated.

SUMMARY

There is provided, in one form, a method for reducing fines migration within a proppant pack in a subterranean formation that includes introducing into the subterranean formation a fluid that contains a base fluid (which may be an oil base fluid, an aqueous base fluid, or an alcohol base fluid), proppants that are solid round grains placed as a slurry into a hydraulic fracture to form a permeable pack that acts to maintain the conductivity of the fracture after the injection is finished and it closes and an amount of a particulate additive effective to reduce fines migration. The particulate additive may have a mean particle size of 5000 nm or less, and may be an alkaline earth metal oxide, alkaline earth metal hydroxide, alkali metal oxide, alkali metal hydroxide, transition metal oxide, transition metal hydroxide, post-transition metal oxide, post-transition metal hydroxide, piezoelectric crystals, pyroelectric crystals, and mixtures thereof. At least a portion of the particulate additives may be adhered to the proppants with an optional coating agent that includes an oil that may be the same as or different from the oil base fluid. Alternatively, an oil coating agent is not included or used and not necessary.

There is additionally provided in another non-limiting embodiment a fluid that contains a base fluid (which may be aqueous-based, alcohol-based or oil-based, but is expected to be typically aqueous-based), proppants selected from the group consisting of sand, gravel, ceramic beads, glass beads and combinations thereof, an optional coating agent which may include an oil that is the same as or different from the base fluid, if the base fluid is oil-based, and an effective amount of a particulate additive to reduce fines migration. The particulate additive may have a mean particle size of 5000 nm or less and may be an alkaline earth metal oxide, alkaline earth metal hydroxide, alkali metal oxide, alkali metal hydroxide, transition metal oxide, transition metal hydroxide, post-transition metal oxide, post-transition metal hydroxide, piezoelectric crystals, pyroelectric crystals, and mixtures thereof. Again, at least a portion of the particulate additives may be coated on the proppants with the optional coating agent. The size of proppants typically is from about 200 micron to about 2000 micron.

There are also provided, in another non-restrictive embodiment, particulate additive-coated proppants that include sand, gravel, ceramic and glass beads, an optional coating agent at least partially coating the proppants, where the coating agent includes oil, and particulate additives adhered to the proppants with the coating agent. The particulate additive has a mean particle size of 5000 nm or less. Again, the particulate additive may be an alkaline earth metal oxide, an alkaline earth metal hydroxide, an alkali metal oxide, an alkali metal hydroxide, a transition metal oxide, a transition metal hydroxide, a post-transition metal oxide, a post-transition metal hydroxide, a piezoelectric crystal, a pyroelectric crystal, and mixtures thereof.

The particulate additives, e.g. MgO and/or $Mg(OH)_2$, and the like, appear to fixate or flocculate dispersed fines, such as clay and non-clay particles, including charged and non-charged particles. Due to at least in part to their small size, the surface forces (like van der Waals and electrostatic forces) of particulate additives help them associate, group or flocculate the fines together in larger collections, associations or agglomerations. These forces and properties are particularly evident when the particulate additives are nano-scale, that is, having a mean particle size of 100 nm or less, but may be manifest in particles larger than nano-scale. Such groupings or associations help fix the fines in place and keep them from moving. In many cases, fines fixing ability of the fluids may be improved by use of particulate additives that may be much smaller than the pores and pore-throat passages within a hydrocarbon reservoir, thereby being non-pore plugging particles that are less damaging to the reservoir permeability than the fines themselves. This smaller size permits the particles to readily enter the formation, and then bind up or fix the fines in place so that both the fines and the particles remain in the formation and do not travel as far—or at least are restrained to the point that damage to the near-wellbore region of the reservoir is minimized.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$, to an aqueous fluid, or solvent-based fluid such as glycol, or oil-base fluid which is then introduced into a subterranean formation is expected to prevent or inhibit movement or migration of fines within a subterranean formation or fixate troublesome fines within the proppant pack in the subterranean formation, and maintain well's productivity for longer time.

DETAILED DESCRIPTION

Figure 1A:
FIG. 1A is a photograph of 20/40 mesh (850/425 micron) sand (proppant) soaked in a mixture of nano-sized MgO particulates and mineral oil to coat the proppant.

Fines fixation has been troublesome during oil and gas production, as well as during many oil and gas recovery operations including, but not necessarily limited to, acidizing, fracturing, gravel packing, secondary and tertiary recovery operations, and the like. As discussed in SPE 81017 referred to above, most of the fines that migrate and cause damage have a charge, and all clay particles generally have an overall negative charge. As defined herein, fines are particles having particle size less than 37 microns (μm).

It has been discovered that small particles like magnesium oxide (MgO) may be used to fixate formation fines such as clay and quartz in subterranean hydrocarbon formations to inhibit, restrain or prevent them from migrating to near-wellbore regions to choke or damage the production of hydrocarbons. Some small sized particles, optionally nano-sized particles, also called nanoparticles herein, not only have high surface areas compared to their small sizes, but also have relatively high surface charges that permit them to associate or connect other particles together, including other charged particles, but also other non-charged particles. In one non-limiting embodiment, these associations or connections between the fines and the small sized particulate additives are due to electrical attractions and other intermolecular forces or effects.

As will be shown, laboratory tests have demonstrated that relatively small amounts of MgO particulate additives can fixate and flocculate dispersed clay particles, and charged and non-charged colloidal silicas. Other particulate additives such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein.

The small sized particulate additives may be pumped with a carrier fluid downhole deep within the formation to fixate fines. Optionally, these particulate additives may be coated on proppant or sand at the surface or during placement downhole for frac-pack and gravel pack applications to fixate formation fines during these procedures. In one non-limiting embodiment, a mixture of an optional coating agent and particulate additives at least partially coat the selected proppant to fixate formation fines within a proppant pack or other porous media, or inhibit or prevent fines from migrating or moving within the subterranean formation. If gravel is at least partially coated with the optional coating agent and the nanoparticles, then the formation fines may be fixated within the gravel pack, or may be inhibited from migrating or moving within the subterranean formation. However, it has been surprisingly discovered that it is not necessary to use a coating agent to bind or coat the particulate additives to the particles (e.g. sand, gravel, beads, etc.) in many instances.

The base fluid or carrier fluid may be water-based, alcohol-based or oil-based, but in most expected embodiments is expected to be water-based. Non-limiting examples of suitable water-based fluids include, but are not restricted to, EMERALD FRAQ™ aqueous fluid containing a crosslinked polymer and DIAMOND FRAQ™ aqueous fluid containing a viscoelastic surfactant (VES), both available from Baker Hughes Inc. In another non-restrictive version, the carrier fluid may be foamed.

The carrier fluid or aqueous-based fluid may be brine. In non-limiting embodiments, the brines may be prepared using salts including, but not necessarily limited to, NaCl, KCl, $CaCl_2$, $MgCl_2$, $NH_4Cl$, $CaBr_2$, NaBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

Suitable optional coating agents include, but are not necessarily limited to, water, brines, glycols, glycol ethers, alcohols, ketones, terpenes, alkyl esters, aromatic compounds, mineral oils or other refined hydrocarbons that accomplishes the purposes of the methods and compositions described herein. Specific, non-limiting examples of suitable brines include, but are not necessarily limited to the brines mentioned above. Specific, non-limiting examples of suitable glycols include, but are not necessarily limited to, propylene glycol, and the like dipropylene glycol, tripropylene glycol, polypropylene glycol, ethylene glycol, diethylene glycol, triethylene glycol, and combinations thereof, while suitable alcohols include, but are not necessarily limited to methanol, isopropanol, hexanol, butanol, octanol and combinations thereof, and suitable glycol ethers include, but are not necessarily limited to ethylene glycol monobutyl ether, ethylene glycol monohexyl ether, diethylene glycol monomethyl ether, propylene glycol monomethyl ether, propylene glycol n-butyl ether, dipropylene glycol dimethyl ether, tripropylene glycol n-butyl ether, and combinations thereof. Specific, non-limiting examples of suitable ketones include, but are not necessarily limited to acetone, diethyl ketone, methyl ethyl ketone, methyl propyl ketone, cyclohexanone and combinations thereof. Specific, non-limiting examples of suitable terpenes include d-limonene, pinene, and combinations thereof. Specific, non-limiting examples of suitable alkyl esters include, but are not necessarily limited to methyl acetate, ethyl acetate, ethyl formate, ethyl propionate, methyl benzoate, methylethyl benzoate, and combinations thereof. Specific, non-limiting examples of suitable aromatic compounds include, but are not necessarily limited to benzene, toluene, xylene, naphthalene and combinations thereof. Specific, non-limiting examples of suitable mineral oils include Conoco-Phillips PURE PERFORMANCE® Base Oil, such as 225N and 600N oils. It is expected that a fines control product will include particulate additives in the optional coating agent oil, for instance about 15 wt % nano-sized MgO particles in the 600N mineral oil or propylene glycol. This fines control product would be added to an aqueous base fluid in a relatively small amount, in one non-limiting embodiment, from about 5 to about 100 gptg. It has been discovered that during mixing, the fines control product (i.e. the nanoparticles in optional oil) will plate out on or at least partially coat the particles, such as proppant particles. That is, since the base fluid is aqueous, the hydrophobic oil will be repulsed by the water and will coat the particles (e.g. proppant). How much coating of the particles that occurs is concentration dependant, based on both the amount of proppant used and the amount of fines control product used. In a non-limiting example the fines control product may additionally have an optional surfactant present, such as an oil-wetting surfactant like sorbitan monooleate (i.e. Span 80 from Uniqema), to improve and/or enhance the oil-wetting of the proppant particles by the fines control product. In another non-limiting example the presence of a surfactant may preferentially reduce the thickness of the 600N mineral oil layer on proppant particles. Reduces oil layer thickness may enhance nanoparticle exposure on proppant particles. Other agents besides Span 80 may be employed to optimize the oil coating or wetting on proppant particles, agents such as: sorbitan esters, ethoxylated sorbitan esters, ethoxylated alcohols, ethoxylated alkyl-phenols, alkyl-dicarboxylics, sulfosuccinates, phospholipids, alkylamines, quaternary amines, alkyl-siloxanes, and the like. It is not necessary that a resin be used as a coating agent or binder, and in one non-limiting embodiment, no resin is used. Water or brines may also be effective coating agent to help the particulate additive coat particles such as sand and ceramic particles. A polymer in water or brine may also be employed to help the particulate additive coat particles like proppant.

However, as noted, it has been discovered that a coating agent may not be required. For instance, a nanoparticle powder, in a non-limiting embodiment magnesium oxide, may be directly mixed with dry proppant beads, and then mixed with a fracturing fluid in a blender to be pumped into generated fractures for formation fines fixation. The nanoparticle powder automatically and spontaneously attach to the proppant surface during the dry mixing without the need of other coating agents, such as oils. Without being limited to any particular explanation, it is believed that the same surface forces which permit the particulate additives to bind up and associate with the fines also attract the particulate additives to the surfaces of the proppant, gravel or other beads, etc. Laboratory proppant pack tests confirm that nanoparticle dry powder mixing with the proppant can efficiently fixate simulated fines in a proppant pack. Again, it will be appreciated that the particulate additives need not be nanoscale to be coated onto the proppant, gravel, beads or other particles without the use of a coating agent, however, the attractive or binding forces may be more pronounced the smaller the particulate additives.

It is expected that at least a portion of the particles or proppant may be "pre-coated" with the fines control agent, for instance a select portion of the proppant may be pre-coated before the job. For instance, pre-coating may be performed at the manufacturing site of the dry proppant or elsewhere. In one non-restrictive version, the fines control agent may be possibly sprayed onto the dry proppant (or other particles) before the proppant is placed in an aqueous treatment fluid.

Mineral oil as an optional coating agent for use with the particulate additives, e.g. nanoparticles, has been found to be suitable for at least two reasons. First, mineral oil and like substances have an affinity to coat particles such as proppant particles as contrasted with remaining as oil droplets containing nanoparticles as a phase internal to the water-based fluid. It appears that the most stable configuration for the fines control agent once placed in an aqueous treatment fluid is to "plate out" or coat or at least partially coat any particles present. The fines control agent has been found to have an affinity to coat evenly onto the particles or proppant when it is placed in an aqueous fluid. Again, the degree of coating is primarily concentration dependent. Second, it has been found that an optional high molecular weight mineral oil coating agent will not disturb the fluid properties of an aqueous fluid containing a polymer gelling agent or a VES gelling agent, and thus it is an ideal media for depositing the nanoparticles onto the proppant without disturbing aqueous fluid properties.

It is theorized that the particulate additives, in one non-restrictive version nanoparticles, remain on the proppant particles primarily by electrostatic and other charges between the nanoparticle and proppant particle surfaces, however, other attractions or coupling forces may exist to initially and over the long-term keep the nanoparticles coated on the proppant particles. The inventors do not want to be limited to any particular theory. It is suspected that in most conditions the optional oil carrier fluid only assists the initial coating process of the nanoparticles on to the proppant particles. However, other agents can be added to the oil carrier fluid that may further enhance the initial and/or long-term nanoparticle attraction to the quartz, glass, ceramic and the like proppant particles composition. Additionally, the surface of the proppant, or a select amount of proppant, may be treated with agents that may improve the overall attraction of the nanoparticles to the proppant.

Nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for fixating fines and inhibiting or preventing their undesired migration, rather than allowing them to damage production of the near-wellbore region of the reservoir.

Magnesium oxide particles and powders have been suitably used to fixate fines herein. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Na, K, Mg, Ca, Ti, Zn and/or Al.

The particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is −9.4 $C/m^2K$. ZnO and these other crystals are generally not water soluble.

In one non-limiting explanation, when the aqueous carrier fluid mixed with very small pyroelectric crystals, such as, but not necessarily limited to, nano-sized ZnO, is pumped downhole into underground formations that are under high temperature and/or pressure, the pyroelectric crystals are heated and/or pressed and high surface charges are generated. These surface charges permit the crystal particles to associate, link, connect or otherwise relate the formation fines together to fixate them together and also to the surrounding formation surfaces. The association or relation of the fines is thought to be very roughly analogous to the crosslinking of polymer molecules by crosslinkers, in one non-limiting image. No formation damage is expected from the use of the nano-sized particulate additives.

In one non-limiting embodiment, the solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the particle size of the additives and agents ranges between about 1 nanometer independently up to about 5000 nanometer. In another non-limiting embodiment, the particle size ranges between about 4 nanometers independently up to about 100 nanometer. In another non-restrictive version, the particles may have a mean particle size of about 5000 nm or less, alternatively about 2000 nm or less, in another non-restrictive version about 100 nm or less, alternatively about 90 nm or less, and in another possible version about 50 nm or less, alternatively 40 nm or less.

The amount of particulate additives in the carrier fluid may range from about 20 to about 500 pptg (about 2.4 to about 60 kg/1000 liters). Alternatively, the lower threshold of the proportion range may be about 50 pptg (about 6 kg/1000 liters), while the upper threshold of proportion of the particles may independently be about 300 pptg (about 36 kg/1000 liters) pptg.

The particulate additives herein may be optionally added to a mineral oil or other hydrocarbon as the carrier fluid—a synergistic combination which also serves to initially coat, or at least partially coat, the nanoparticles to the sand or proppant, which are then pumped into place downhole in a hydraulic frac, frac-pack or gravel pack treatment.

In another non-limiting embodiment, the particulate additives coated on proppant or sand herein may be added to an aqueous fluid during a treatment with or without an optional coating agent.

In hydraulic fracturing applications, propping agents or proppants are typically added to the base fluid. The propping agents are normally used in concentrations between about 1 to 14 pounds per gallon (120-1700 $kg/m^3$) of fracturing fluid composition, but higher or lower concentrations may be used as the fracture design requires. The proppant, solid particle or gravel may be any solid particulate matter suitable for its intended purpose, for example as a screen or proppant, etc. Suitable materials include, but are not necessarily limited to sand (e.g. quartz sand grains), sintered bauxite, bauxite grains, walnut shell fragments, aluminum pellets, nylon pellets, sized calcium carbonate, other sized salts, glass and/or ceramic beads, and the like, and combinations thereof. These solids may also be used in a fluid loss control application.

While the fluids herein are sometimes described typically herein as having use in fracturing fluids, it is expected that they will find utility in gravel pack fluids, displacement fluids and the like. In the case where the carrier fluid is an acidizing fluid, it also contains an acid. In the case where the carrier fluid is also a gravel pack fluid, the fluid also contains gravel consistent with industry practice.

Laboratory tests have shown that 35 nanometer MgO particles and optional mineral oil coated on a 20/40 mesh (850/425 micron) sand (proppant) pack can successfully fixate simulated formation fines. However, these same MgO particles may be dry coated on the proppant (or other particles)

without a coating agent like mineral oil and still successfully fixate simulated formation fines.

In another non-limiting version, the particulate additives may be coated on proppant or sand at a proppant supplier facility before a fracturing, frac-pack or gravel pack treatment. In a different non-limiting embodiment, a select portion of the proppant may be lightly coated with mineral oil or other optional coating agent containing nanoparticles during a treatment, or after a frac-pack or gravel pack treatment, and pump the mineral oil-slurried nanoparticles into the pack. It has been discovered that mineral oil-coated nanoparticles tend to be attached to, adhered to, or bound to the proppant or sand.

The invention will be further described with respect to the following Examples which are not meant to limit the invention, but rather to further illustrate the various embodiments.

EXAMPLES

Example 1

20/40 mesh (850/425 micron) sand (proppant) was soaked in a mixture of nanoparticles (1 ppg 35 nm sized MgO (product #12N-0801 available from Inframat Advance Materials) and 600N mineral oil (available from ConocoPhillips) to coat the 20/40 mesh (850/425 micron) sand with the nanoparticles. The coated sand was then packed in a one-inch (2.54 cm) ID acrylic tube. A 5% KCl solution was pumped through the pack at 2 ml/min for 2 hours. The photograph of FIG. 1A was taken for the sand pack after pumping 5% KCl before simulated fines were flowed through the pack.

Figure 1B:
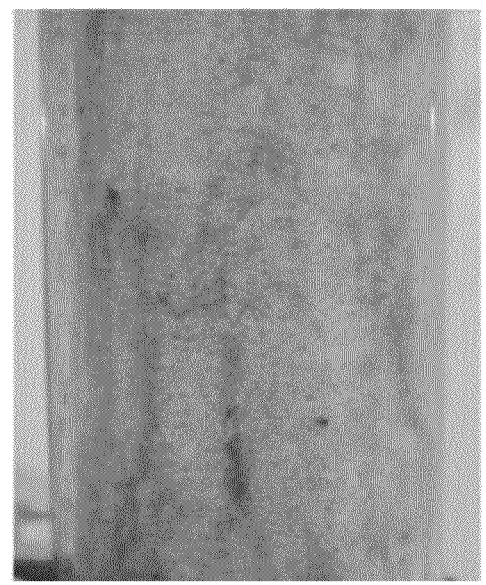
FIG. 1B is a photograph of the 20/40 mesh (850/425 micron) sand of FIG. 1A where simulated formation fines dyed a green color (appearing as a darker gray in the Figures) fixated in channels by the nano-sized MgO particles.

The simulated formation fines were negatively charged colloidal silica (10% AM anionic sols available from LUDXO Colloidal Silica) and dyed in green color. After first pumping 5% KCl through the sand pack, the simulated formation fines were pumped through the pack at 1 ml/min for 1 hour and then at 2 ml/min for another hour. Then 5% KCl was again pumped at 1 ml/min for 1 hour and 2 ml/min for another hour. After the pumping, the photograph of FIG. 1B was taken. The green channels (which show up as darker gray channels in the grayscale Figures) show where the simulated formation fines were fixated by nanoparticles that were coated on the sand.

Example 2

Figure 2:
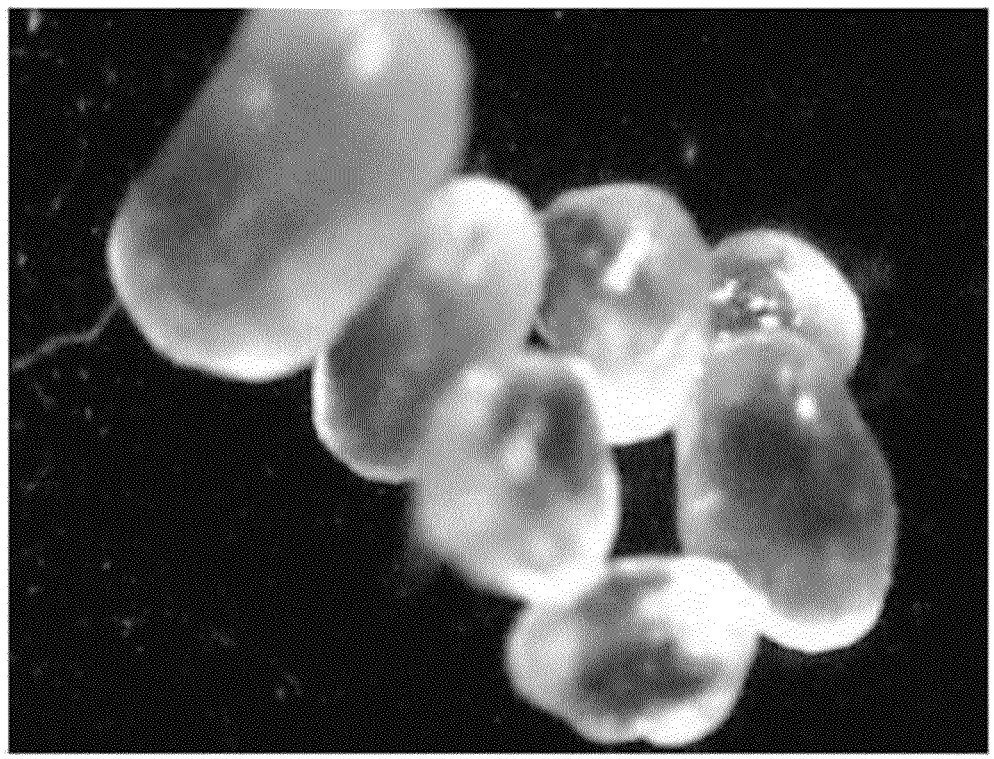
FIG. 2 is a microphotograph (60×) of nanoparticles coating 20/40 mesh (850/425 micron) sand before formation fines were flowed through the sand pack.

The photograph of FIG. 2 was taken at 60 times magnification. It is a microphotograph showing MgO nanoparticles and mineral oil coating 20/40 mesh (850/425 micron) sand before formation fines were flowed through the sand pack.

Example 3

Figure 3:
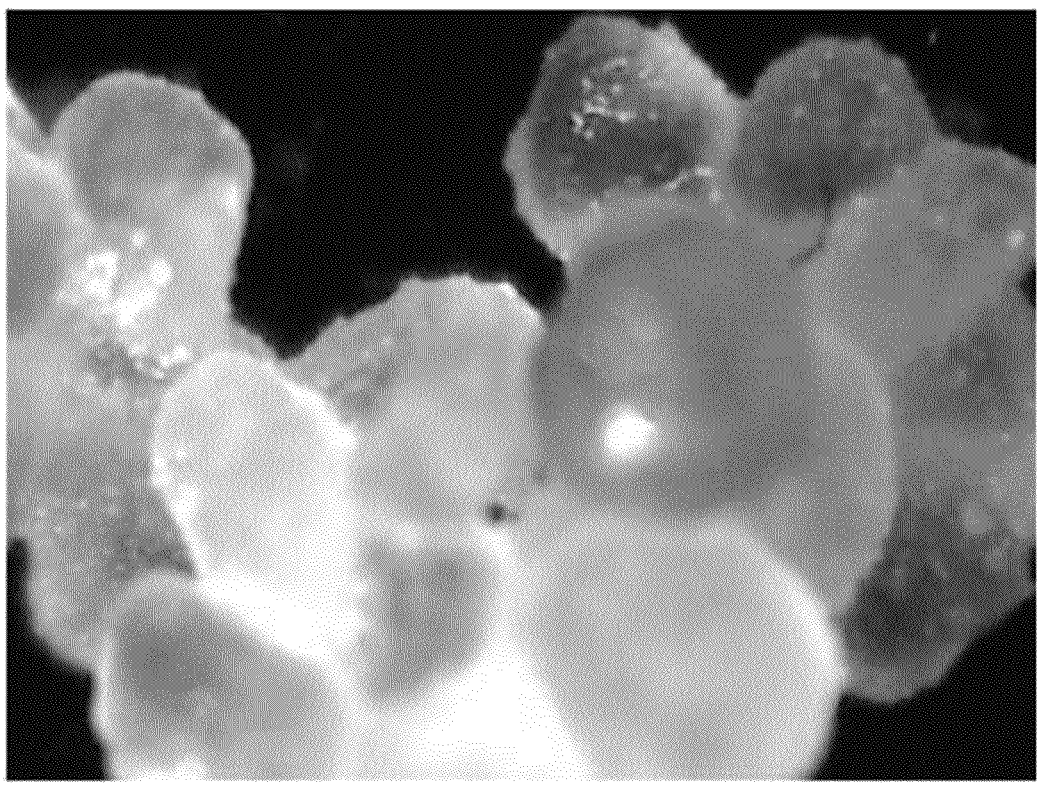
FIG. 3 is a microphotograph (60×) of the 20/40 mesh (850/425 micron) sand of FIG. 2 coated with nanoparticles after formation fines were flowed through the sand pack and 5% KCl flushed the sand pack, showing formation fines fixated on the nanoparticle-coated sand.

The microphotograph of FIG. 3 (also 60×) shows the 20/40 mesh (850/425 micron) sand coated with MgO nanoparticles after the formation fines were flowed through the sand pack, and 5% KCl was flushed through the sand pack. The formation fines are clearly shown as fixated on the nanoparticles-coated sand.

Example 4

In a lab experiment, 0.3 gram of 35 nm magnesium oxide powder was mixed with 300 gram of 20/40 mesh (850/425 micron) gravel pack sand in a dry bottle; then they were packed in 1 inch (2.54 cm) ID and 18 inches (30.5 cm) long acrylic tube with 100 mesh (150 micron) stainless screen at bottom end. In another same sized tube 300 gram of 20/40 mesh (850/425 micron) gravel pack sand alone was packed in the same fashion as in the previous acrylic tube. The introduction of fines was simulated by a simple gravity feed of 0.25% bw (by weight) Rev Dust in water from top ends of both sand pack tubes. The effluents from bottom ends of tubes were collected by each pore volume for turbidity measurements. The mean particle size of the Rev Dust was about 20 microns and it contains 12% bw quartz, 7% bw cristobalite, 4% bw illite, 29% bw mixed layers (bentonite), 26% bw kaolinite, and 22% bw chlorite. The results of turbidity measurements for the effluents were: for sand alone, the turbidity of the 1st pore volume flowed out of the pack was 775 FAU (Formazin Attenuation Unit), that of 2nd pore volume 671 FAU, and the 3rd 650 FAU. For the nanoparticle dry mixed sand pack, the turbidity of the 1st pore volume flowed out of the pack was 54 FAU, that of 2nd pore volume was 1 FAU, and the turbidity of the 3rd pore volume was 1 FAU. It may thus be seen that the simulated proppant (sand) pack that were coated with nanoparticles of MgO without a coating agent also greatly fixated the simulated fines onto the sand bed particles. The turbidity measurements were much lower than those from the proppant bed that did not have particulate additives coated thereon.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and pyroelectric crystals, of various sizes; brines; base fluids; proppants (sand, ceramic or glass beads, gravel); optional coating agents (oils) and other components falling within the claimed parameters, but not specifically identified or tried in a particular composition, are anticipated to be within the scope of this invention.

The words "comprising" and "comprises" as used throughout the claims is to interpreted "including but not limited to".

The present invention may suitably comprise, consist or consist essentially of the elements disclosed and may be practiced in the absence of an element not disclosed. For instance, the fluids may consist essentially of or consist of a base fluid, particles and an effective amount of a particulate additive, as further defined by the claims.

What is claimed is:

1. A method for reducing fines migration within a particle pack in a subterranean formation comprising introducing into the subterranean formation a fluid comprising:
   a base fluid selected from the group consisting of water-based fluids, alcohol-based fluids and oil-based fluids;
   particles selected from the group consisting of sand, gravel, ceramic beads, glass beads and combinations thereof; and
   an amount of a particulate additive effective to reduce fines migration, the particulate additive
      having a mean particle size of 5000 nm or less,
      being selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof; and coated on the particles in the absence of an oil coating agent.

2. The method of claim 1 where
the alkaline earth metal is selected from the group consisting of magnesium, calcium, strontium, and barium,
the alkali metal is selected from the group consisting of lithium, sodium, potassium,
the transition metal is selected from the group consisting of titanium and zinc, and
the post-transition metal is aluminum, and mixtures thereof.

3. The method of claim 1 where the effective amount of the particulate additive ranges from about 20 to about 500 pptg (about 2.4 to about 60 kg/1000 liters) based on the fluid.

4. The method of claim 1 where the fluid is selected from the group consisting of a fracturing fluid, a gravel pack fluid, and a frac pack fluid.

5. The method of claim 1 where the mean particle size of the particulate additive is 2000 nm or less.

6. The method of claim 1 where fines migration is reduced as compared to an identical fluid absent the particulate additive.

7. A method for reducing fines migration within a particle pack in a subterranean formation comprising introducing into the subterranean formation a fluid comprising:
an aqueous base fluid;
particles selected from the group consisting of sand, gravel, ceramic beads, glass beads, and combinations thereof; and
an amount of a particulate additive effective to reduce fines migration, the particulate additive
having a mean particle size of 5000 nm or less,
being selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof;
where:
the alkaline earth metal is selected from the group consisting of magnesium, calcium, strontium, and barium,
the alkali metal is selected from the group consisting of lithium, sodium, and potassium,
the transition metal is selected from the group consisting of titanium and zinc, and
the post-transition metal is aluminum, piezoelectric crystals, pyroelectric crystals, and mixtures thereof, and
coated on the particles in the absence of an oil coating agent.

8. The method of claim 7 where the effective amount of the particulate additive ranges from about 20 to about 500 pptg (about 24 to about 60 kg/1000 liters) based on the fluid.

9. The method of claim 7 where the fluid is selected from the group consisting of a fracturing fluid, a gravel pack fluid, and a frac pack fluid.

* * * * *